United States Patent

[11] 3,562,635

| [72] | Inventor | Gerald R. Parker<br>Longmont, Colo. |
|---|---|---|
| [21] | Appl. No. | 768,902 |
| [22] | Filed | Oct. 16, 1968 |
| [45] | Patented | Feb. 9, 1971 |
| [73] | Assignee | International Business Machines<br>Corporation<br>Armonk, N.Y.<br>a corporation of New York |

[54] APPARATUS AND METHOD FOR DETECTING DEFECTS IN MAGNETIC TAPE
12 Claims, 16 Drawing Figs.

[52] U.S. Cl. .................................................. 324/34,
179/100.2
[51] Int. Cl. ................................................ G01r 33/12
[50] Field of Search ........................................ 324/34, 34
(tape), 34(Hard), 37, 100.2(B); 179/100.2K

[56] References Cited
UNITED STATES PATENTS
2,221,570  11/1940  Brace et al. .................... 324/37

| 2,528,290 | 10/1950 | Wiegand | 324/34 |
| 2,937,368 | 5/1960 | Newby | 340/174.13 |
| 2,995,701 | 8/1961 | Lloyd | 324/37 |
| 3,432,747 | 3/1969 | Quittner | 324/34 |

FOREIGN PATENTS
| 151,091 | 2/1962 | U.S.S.R. | 324/37 |
| 1,076,168 | 7/1967 | Great Britain | 324/34H |

*Primary Examiner*—Rudolph V. Rolinec
*Assistant Examiner*—R. J. Corcoran
*Attorneys*—Hanifin and Clark and Homer L. Knearl ABSTRACT: This invention detects tape defects down to and in the order of $10^{-5}$ inches in diameter or depth. This detection is achieved by recording DC test signals that do not saturate the tape, but instead provide a gradient of DC magnetization through the tape. The detection of very small or very shallow defects is further enhanced by use of an integrating amplifier in the fault-detecting circuit connected to the test read head. The output of the integrating amplifier is a signal which is very similar to the surface appearance of the tape.

INVENTOR
GERALD R. PARKER
BY *Homer L. Knearl*
AGENT

APPARATUS AND METHOD FOR DETECTING DEFECTS IN MAGNETIC TAPE

BACKGROUND OF THE INVENTION

Prior tape testing has consisted of (1) recording a strong direct current which saturated the tape or (2) recording an alternating current signal which saturated the tape or (3) recording a high frequency AC signal so weak that it penetrates only to a shallow depth in the tape. Each of these recording techniques are useful in detection of specific types of defects in tape. However, none of the techniques in and of themselves successfully detect all types of defects in a tape.

In the case of a DC saturated tape, test circuitry attached to the read head looks for pulses picked up from the saturated tape by the read head. The read head generates the pulses when a fault in the tape causes a change of flux in the read head as the DC saturated tape moves under the read head. The shortcoming of this test is that it does not detect shallow holes in or bumps on the tape that are in the order of $10^{-5}$ inches deep.

In AC saturated tape testing, a test circuit, attached to the read head monitors the envelope of the AC signal from the saturated tape. This envelope of the AC signal will correspond in amplitude to the thickness of the oxide coating on the magnetic tape. Large defects ($10^{-3}$ inches in diameter) in the tape cause the tape to be either much thicker or much thinner than normal. The envelope of the AC signal will fluctuate as the read head moves over a large hole or bump. This testing technique is inadequate since it does not detect shallow holes or bumps or deep holes of very narrow diameter.

In AC shallow recording tape testing, the test circuit attached to the read head looks to the amplitude of each half cycle of the AC signal to check if that amplitude is below a threshold level. The test circuit is complex in that it contains a sampling circuit for sampling the peak portion of the AC recorded signal and also a threshold circuit for detecting when the sampled portion exceeds a threshold. Synchronization must be maintained between the sampling circuit and the frequency of the signal read by the read head. Accordingly, the frequency of the recorded signal on the tape and speed of the tape must be accurately controlled. If the test circuit, the recording frequency, and the speed of the tape are all properly adjusted, AC shallow recording can detect very shallow defects in the surface of the tape. The shortcoming of AC shallow testing is that it will not pick up small diameter defects (in order of $10^{-5}$ inches) no matter how deep they may be in the tape. Also, the complexity of the circuits and adjustment of the equipment means the technique is very costly and difficult to work with.

At present, complete testing of the tape requires that the tape be run through a combination of the above-mentioned tests so as to detect all defects. The typical combination is to use DC saturation to detect all deep hole defects in the tape, and AC shallow tape testing for detecting most shallow defects. This combination will still not detect shallow defects of very small diameter. Furthermore, a great deal of hardware is involved in that two tests must be performed and the AC shallow test particularly requires a great amount of hardware.

It is an object of this invention to test for all defects including those in the order of $10^{-5}$ inches in depth or diameter.

It is a further object of this invention to test for all small and shallow defects in a tape by use of single tape testing technique.

It is a further object of this invention to test for all defects, shallow or small in size in a tape, by use of a direct current gradient recording tape testing technique.

It is a further object of this invention to measure the surface roughness of magnetic tape with simple, low cost testing apparatus which requires little or no adjustment.

SUMMARY OF THE INVENTION

In accordance with this invention, the above objects are accomplished by recording a DC or low frequency signal on the tape which does not saturate the tape, but, instead, provides a gradient of magnetization through the tape. The gradient of magnetization in the tape is such that the strongest magnetization is near the surface, and the magnetization becomes weaker further into the tape. When the magnetic tape is read, the read out signal will fluctuate markedly, if there is a defect, even a shallow one or a small one, in the magnetic tape.

The read out of fluctuations caused by defects in the tape may be further enhanced by monitoring the read out head with an integrating circuit. The integrating circuit produces an output signal whose fluctuations correspond closely to the fluctuations of the surface of the tape. In effect, the integrating function of the integrator balances out the differentiating function of the read head so as to reproduce the fluctuations in flux caused by defects in the surface of the tape.

The advantages of my invention over prior tape testers are several fold. First, this testing technique will detect all defects, large, small, shallow, or deep and, therefore, it is not necessary to use a multiplicity of testing techniques as in the past to pick up all the defects. Second, my tester is much simpler in the construction and operation than prior testers. For this reason, the cost of my system is much lower and maintenance in operation of it is much less costly. Third, the signal produced by the integrator attached to the read head of my testing apparatus is either an exact replica of the surface roughness or a measure of the surface roughness, depending upon the width of the read head used. Altogether, my tape tester gives more accurate information about the surface of a tape and costs less, and is easier to operate than prior testers.

The foregoing and other objects, features, and advantages of the invention will be apparent from the following more particular description of a preferred embodiment of the invention, as illustrated in the accompanying drawings.

DESCRIPTION

Figure 1:
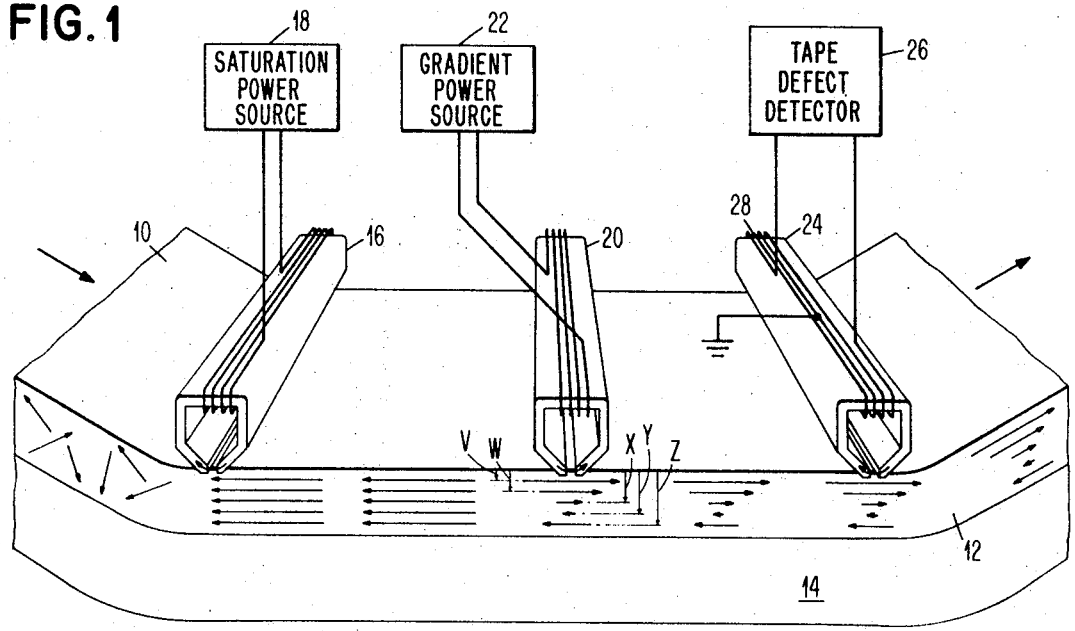
FIG. 1 shows a strip of magnetic tape being recorded and tested with wide track magnetic heads.

The preferred embodiment of the invention is shown in FIG. 1. Magnetic tape 10, with a magnetic oxide coating 12, on a substrate 14, is moved past three magnetic heads. The tape is under tension supplied by vacuum columns or reel motors in the well known manner. This tension causes the tape to be in contact with the magnetic heads. If desired, an air bearing may be used between the tape and the erase head or read head; however, the nonsaturating record head 20 must be in contact with the tape. The three magnetic heads perform the functions of erase or saturate, nonsaturating record, and read.

Magnetic head 16 is the erase head. It is driven by a power source 18. The power source 18 drives the head 16 sufficiently hard to saturate the oxide layer 12 of the magnetic tape. This erase or saturating function may be accomplished either by a DC or AC power source. The invention operates either with a DC or AC erase; however, as will be discussed later, the best result is obtained by DC erase or DC saturation of the magnetic tape.

Magnetic head 20 records a nonsaturating signal on the tape 10. Magnetic head 20 is driven by gradient power source 22 to provide a gradient of flux through the magnetic tape. Gradient of flux means that the flux parallel to the surface of the tape 10 decreases in strength with distance away from the magnetic head. This gradient of flux causes a gradient of magnetization to be recorded in the oxide layer 12 of the tape 10.

The variable power source 22 is a DC power source. It will be appreciated by one skilled in the art that a low frequency AC power source is equivalent to a DC power source if the frequency is so low relative to tape speed that, for practical purposes, that tape is DC recorded. The best, or most effective, testing of the tape is accomplished by a DC power source which magnetizes the tape 10 in a direction opposite to DC saturated magnetization of the tape 10 provided by magnetic head 16.

To detect defects, magnetic head 24 monitors the tape 10 for flux changes. The flux changes are amplified, integrated, and compared to a reference by the tape defect detector 26. When the flux change exceeds a threshold of value, the tape defect detector will indicate the presence of a defect. The tape may than be stopped and examined under a microscope to see if the defect may be corrected.

Magnetic read head 24, as shown, is a wide track head overlapping the edges of the tape. Use of a single wide track head adds to the simplicity and low cost of the tester. If desired, a single, narrow read head covering a portion of the tape could be used, but this would require a plurality of tape defect detectors and unduly raise the cost of the tester.

Figure 2:
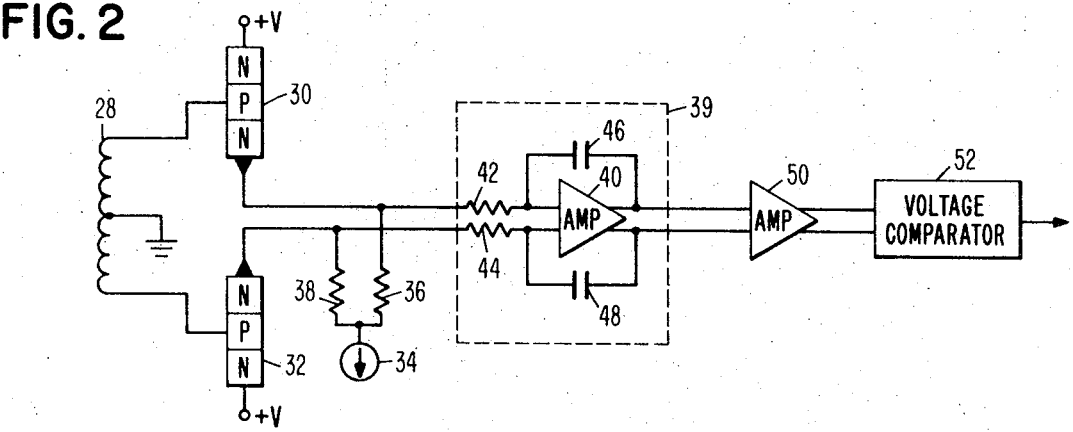
FIG. 2 is a schematic diagram of the tape defect detector of FIG. 1.

The details of the tape defect detector 26 are shown in FIG. 2. Winding 28 on magnetic head 24 is center tapped to ground. Each end of the magnetic winding 28 is attached to the base of a NPN transistor. The NPN transistors 30 and 32 are biased by a positive voltage source at the collector and a current source 34 at the emitter. Current source 34 acts on transistor 30 via resistor 36, and on transistor 32 via resistor 38. Transistors 30 and 32 then act as a head amplifier to amplify the current from winding 28 and apply it to an integrator 39. The output from the emitter of transistors 30 and 32 are identical waveforms. However, the waveforms are of opposite polarity relative to ground.

The waveforms are applied to integrator 39 consisting of differential amplifier 40, having in put resistors 42 and 44, with capacitors 46 and 48 in feedback loops. The integrator operates in the well known manner of an operational amplifier in the integrating mode. The differential configuration for the amplifier is used to reduce common mode noise and, thereby, improve the signal-to-noise ratio.

From the integrator, the two integrated signals are applied to a second differential amplifier 50 for amplification. The output of the amplifier 50 feeds a differential voltage comparator 52.

The differential configuration for the tape defect detector is shown in FIG. 2 because it has operative advantages over a single-sided configuration. Namely, the differential configuration has a better signal-to-noise ratio because common mode noise may be balanced out. However, it will be appreciated by one skilled in the art that the tape defect detector could be implemented with one end of the read coil feeding a single-sided integrator, amplifier, and comparator.

Figure 5:
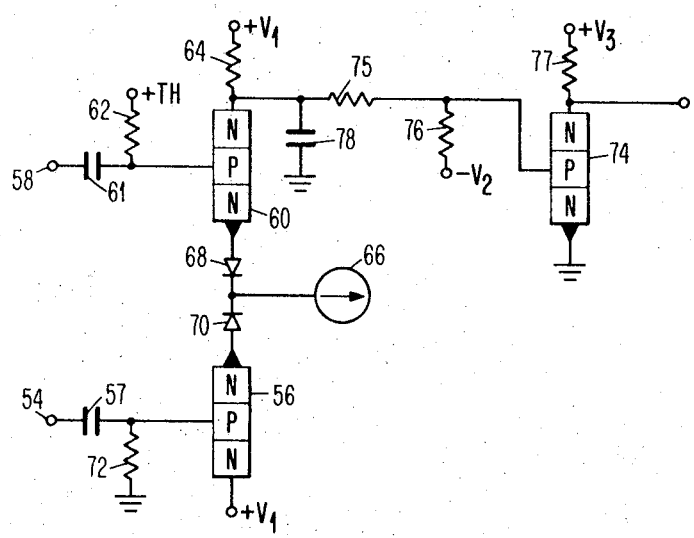
FIG. 5 is a schematic diagram of the voltage comparator in FIG. 2.

A schematic diagram of the differential voltage comparator 52 is shown in FIG. 5. Positive pulses relative to ground appear at input 54 and are applied to the base of NPN transistor 56 via capacitor 57. Negative pulses to ground appear at input 58 and are applied to the base of transistor 60 via capacitor 61. The base of transistor 60 is normally at a threshold voltage level +TH. This voltage is applied to the base by voltage source +TH through resistor 62.

Transistor 60 is normally biased "on" and conducts current from the voltage source, +V$_1$, connected to its collector via resistor 64 to current source 66, connected to its emitter by diode 68. Transistor 56 is similarly biased by voltage source V$_1$ attached to its collector, and current source 66 connected to its emitter by diode 70. Transistor 56 is normally nonconducting because its base is held at ground by resistor 72 being connected to ground. With the base of transistor 56 at ground, and the emitter of transistor 60 at some positive voltage, the base-to-emitter junction of transistor 56 is back-biased and transistor 56 is, therefore, nonconducting.

The remaining NPN transistor 74 in the comparator circuit of FIG. 5 is normally nonconducting, because transistor 60 is conducting and holds the base of transistor 74 below ground. If transistor 60 becomes nonconducting, however, the voltage at the collector of transistor 60 rises and, in turn, the voltage at the base of transistor 74 rises above ground and transistor 74 becomes conducting. When transistor 74 becomes conducting, the voltage at its collector terminal drops from +V$_3$ to very close to ground resistor 77 takes most of the V$_3$ voltage. This drop in voltage from V$_3$ to ground serves as the output signal. Resistors 75 and 76 are merely biasing resistors to control the turning on and turning off of transistor 74. Capacitor 78 passes high frequency transients to ground. These transients are created during the switching of transistors 60 and 74.

The differential voltage comparator of FIG. 5 produces an output signal at the collector of transistor 74 when the difference voltage between the positive pulse at input 54 and the negative pulse at input 58 exceeds the threshold voltage level +TH. When this condition exists, the base-to-emitter junction of transistor 56 will become forward biased, while the base-to-emitter junction of transistor 60 becomes reverse biased. Transistor 60 then turns off, and transistor 74 becomes conducting. The drop in voltage at the collector of transistor 74 signals the presence of pulses whose differential sum is greater than the threshold level. Of course, the threshold level may be set at any value. This threshold, in controlling the size of pulses which will cause an output signal thereby controls the size of pulses which will be indicative of a defect in the magnetic tape.

Figure 6A:
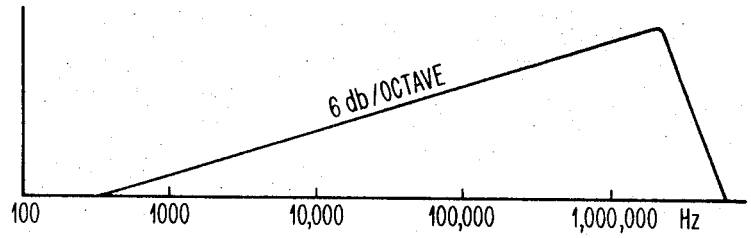
FIG. 6 shows some typical frequency response curves representative of circuits in the tape defect detector.

Another significant feature in the design of the tape defect detector of FIG. 2 is shown by the frequency response diagrams in FIG. 6. FIG. 6A shows the frequency response of the magnetic head 24 (FIG. 1). The magnetic head acts as a differentiator and, thus, its frequency response rises at about 6 db/octave.

Figure 6B:
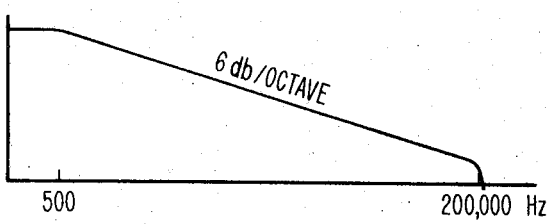

In FIG. 6B the gain vs. frequency of the integrator amplifier is shown. Because of the integration function, the gain of the integrator amplifier decreases at the rate of 6 db/octave. By adjusting the input resistors and the feedback capacitors in the integrator, it is possible to control the frequency range over which this decrease in gain is linear.

Figure 6C:
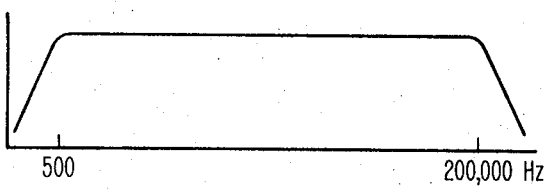

In FIG. 6C, the overall gain from the tape head through the integrator amplifier is shown. The combined effect is that from the head through the integrator amplifier, the system has a flat frequency response from about 500 Hz to 200,000 Hz. This region of flat frequency response, as pointed out above, is adjustable, depending upon the values chosen for the input resistors 42, 44 and the feedback capacitors 46, 48. The band width of 500 Hz to 200,000 Hz is desirable for tape speeds in the order of 100 or 200 inches/second.

The advantage of having a flat frequency response in the tape defect detector is that the amplified signal applied to the voltage comparator varies directly and is an image of surface roughness and surface defects averaged over the width of the read head. The differential signals out of integrator 39 (FIG. 2) could be visually displayed to show the surface roughness of the tape. When a wide magnetic read head is used, the signals from integrator 39 represent an average tape roughness along the width of the head. If a very narrow track head were used, the actual surface variations passing under the head could be displayed.

OPERATION

Figure 3:
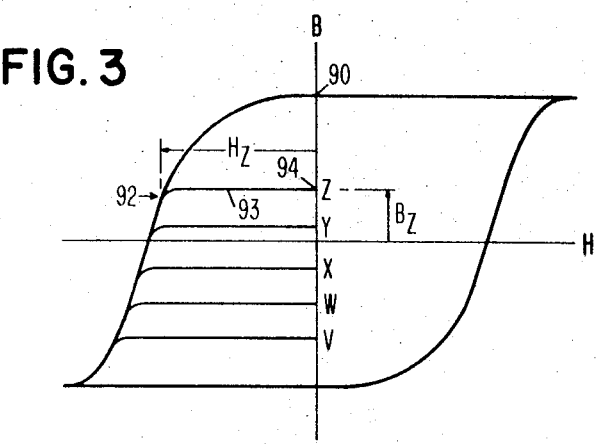
FIG. 3 shows a hysteresis loop for the magnetic tape.
Figure 4:
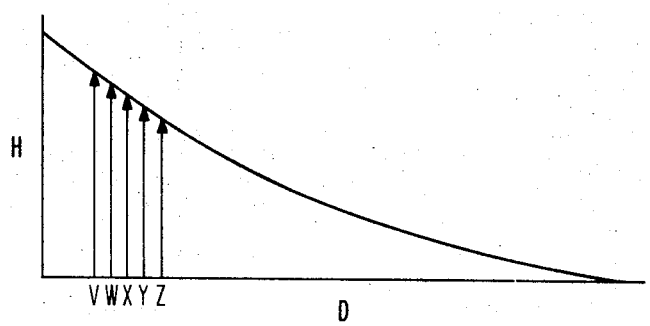
FIG. 4 is a plot of the field strength in the tape vs. distance from the magnetic head.

The manner in which the invention detects defects is best understood by simultaneous reference to FIGS. 1, 3, and 4. As the tape moves from left to right, the tape first encounters the erase head 16. Erase head 16 is strongly driven by a DC power source, and saturates the magnetic oxide layer 12 with a magnetic field directed to the left. The tape then moves on to a position under magnetic head 20. Magnetic head 20 is driven by a DC source which provides an H flux field in the tape in the opposite direction to that of the magnetization in the tape established by erase head 16. The strength of the H field vs. distance from the magnetic head 20 is shown in the graph of FIG. 4. The strength of the field is plotted vertically, while the distance from the head is plotted horizontally. The curve is the well known exponential, showing decrease of H field at positions more remote from the magnetic head.

With the strength of the H field under the magnetic head 20 specified by the graph in FIG. 4, the magnetization of the tape 10 can be found by referring to the hysteresis loop of the tape shown in FIG. 3. In FIGS. 1, 3, and 4, the reference characters of V, W, X, Y, and Z indicate the magnetization at given distances from the head. For example, for distance Z from the head, the field strength in the tape under the head is Hz. Before the tape moves under the magnetic head 20, its magnetization is at point 90 on the hysteresis loop of FIG. 3. The Hz field from the head causes the magnetization of the tape to move to point 92. As the tape leaves the magnetic head 20, the H field from the head is removed and the magnetization of the tape Bz follows the curve 93 to point 94, where the H field is O and the final magnetization is Bz.

The Bz vector in FIG. 3 corresponds to the vector shown in FIG. 1 under the tape head 20 at a depth Z from the tape head. Similarly, the other vectors at depths V, W, X, and Y from the tape head 20 may be found by determining the strength of the H field at that depth from FIG. 4, applying that H field to the hysteresis loop of FIG. 3, and then determining the B vector or magnetization at that depth from the vertical dimension of FIG. 3.

As can be seen in FIG. 1, the effect on the magnetic oxide layer 12 is to record a gradient of magnetization through the layer 12. Near the top of the oxide layer, the magnetization is strongly reversed from that of the erase or saturation magnetization. Further into the magnetic oxide layer, the magnetization decreases until it reaches O. Still further into the oxide layer, the magnetization remains in the same direction as the erase direction, but is of a smaller magnitude.

It will be apparent to one skilled in the art that the degree of the gradient can be controlled by the strength of the current driving the magnetic head 20 and by the write-gap length of head 20. Also, the magnetic tape could be AC erased, or not erased at all, by magnetic head 16 and magnetic head 20 could still record a gradient of magnetization in the tape. However, the amplitude of the gradient is enhanced by erasing the tape in the opposite direction to the gradient magnetization applied by the tape head 20.

As shown in FIG. 1, the tape moves from the magnetic head 20 to the read head 24. Since the tape has been DC recorded by the magnetic head 20. The tape head 24 will have no output except when defects in the tape or surface roughness in the tape cause flux changes in the magnetic head 24.

Figure 7:
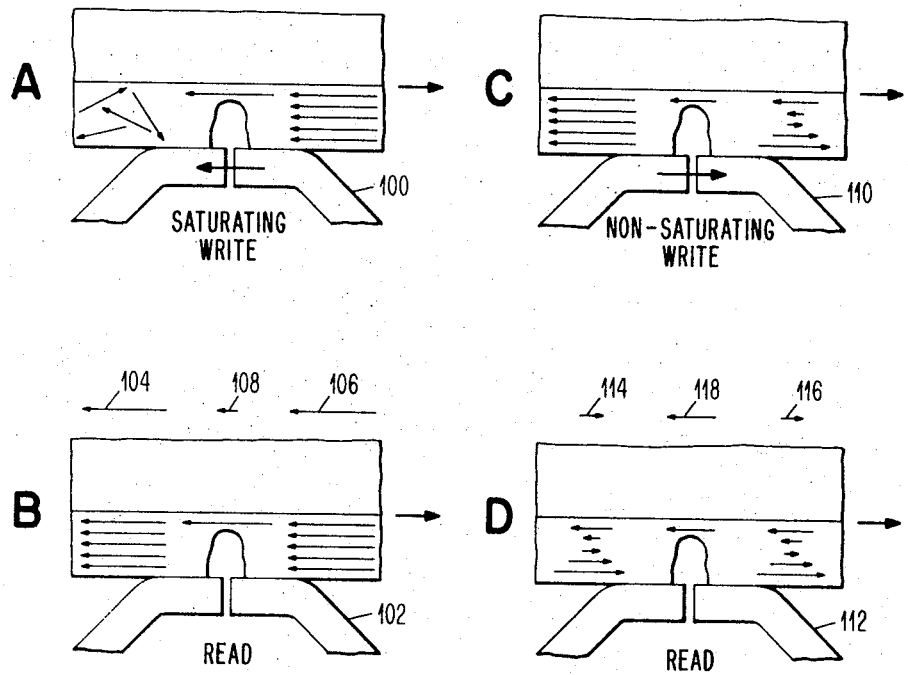
FIG. 7 shows the interaction between read/write heads and tape in prior testers and in the inventive tester when the testers are to detect a hole in the magnetic oxide of the tape.
Figure 8:
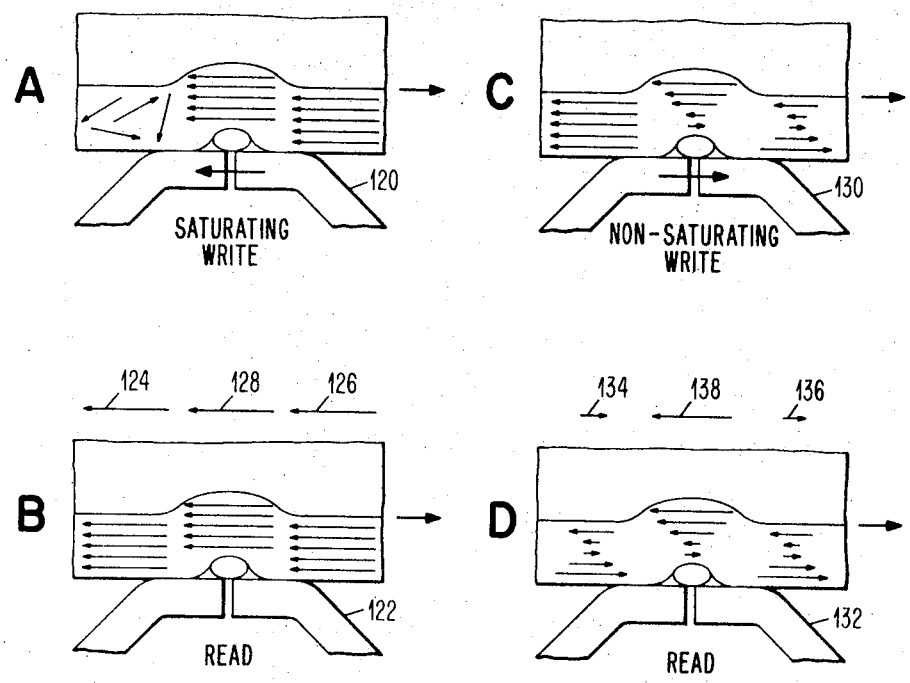
FIG. 8 shows the interaction between read/write heads and tape in prior testers and in the inventive tester when the testers are to detect particles affixed to the tape surface or bumps on the tape surface.

The manner in which the invention improves detection of defects is more clearly seen by reference to FIGS. 7 and 8, where the prior art method for detection is shown alongside of the inventive method for detection of defects. First, in FIG. 7, the interaction of read/write heads with magnetic is shown, wherein the magnetic tape has a hole or void defect.

In the prior art, holes in the tape were usually detected by DC saturating the tape as in FIG. 7A, and then reading the saturated tape, as in FIG. 7B. In operation, the tape passed over the saturating write head in FIG. 7A. Because the hole is present in the tape, only a small amount of magnetic oxide is available to be saturated in the vicinity of the hole. Accordingly, when the saturated tape passed over the read head, a decrease in flux was detected by the read head.

The decrease in flux read out at a given position of the tape is the composite of all the magnetization fields through the depth of the magnetic oxide at that point. The length of arrows immediately above the tape in FIG. 7B is representative of the composite magnetization of the tape or flux seen by the read head at that point. Where there is no hole in the magnetic oxide, the composite magnetization, as indicated by arrows 104 and 106, is relatively large. On the other hand, in the vicinity of the hole or void, the composite magnetization indicated by arrow 108 is of the same direction as arrows 104 and 106, but is much smaller in magnitude. As is well known, the change in magnetization as the tape moves past the read head 102 produces a flux change in the read head 102 which is picked up as a pulse by the windings on the read head.

FIGS. 7A, 7C, and 7D show the interrelation of the magnetic heads and the magnetic tape in the testing method of the invention. The magnetic tape is again saturated by the write head 100. The tape then passes to a position over the nonsaturating write head 110. As pointed out previously, the nonsaturating write head 110 provides a gradient of flux through the magnetic oxide of the tape and, correspondingly, causes a gradient of magnetization in the magnetic oxide of the tape. When the hole is positioned over the nonsaturating write head, a part of the gradient of magnetization in the magnetic tape is eliminated, simply because there is no magnetic oxide. The effect of this elimination of part of the gradient shows up in the reading of the gradient recorded tape, as shown in FIG. 7D.

The read head 112 sees a flux component which is the composite of the magnetization gradient through a given position on the tape. Where there is neither a hole nor a void in the tape, the composite flux seen by the read head 112 is represented by the arrows 114 and 116. As indicated in FIG. 7D, arrows 114 and 116 are small in size since, in the example shown, the magnetic tape contains magnetization components of varying strength and of opposite polarity. The composite is a small vector pointing to the right, as shown in arrows 114 and 116. However, when the hole or void passes over the read head 112, all components of magnetization in the gradient have been eliminated except one larger component pointing to the left. The read head would then see this one larger component pointing to the left, as represented by arrow 118. Accordingly, as the tape moves over the read head 112, the flux in the head changes from a small amount to the right to a large amount to the left. This considerable flux change produces a pulse in the windings of the read head 112. As can be seen by comparing the size of the composite vectors in FIGS. 7B and 7D, the flux change detected by read head 112 will be slightly larger than the flux change detected by read head 102.

However, the area in which the invention produces a very substantial and important improvement over prior DC tape testing is in the detection of shallow defects or shallow bumps, as shown in FIG. 8. In FIG. 8, a shallow bump is illustrated in the same manner as in FIG. 7, showing the operation of the prior art DC saturation testers and the inventive gradient DC tape tester.

In a prior art DC saturation tape tester a foreign particle attached to the tape causes very little flux change at a read head. As can be seen in FIG. 8A, the foreign particle causes the magnetic tape to bump or tent as it rides over the saturating write head 120. However, because the write head is by the tape, the small movement of the magnetic oxide layer away from the tape head does not reduce the ability of the head to completely saturate the magnetic oxide layer which is tented by the foreign particle. When the saturated tape is then passed over the read head 122, the foreign particle again causes the tape to tent. The effect on the read head is to move the saturated magnetic tape slightly further away from the head. Because the tape is saturated, the movement of the tape away from head 122 does not reduce the composite flux picked up by the head. This is shown in FIG. 8B in that the arrows 124, 126, and 128 are all the same length. Therefore, read head 122 does not see the bump on the tape.

On the other hand, in the invention, the tape moves from a saturating write head 120 to a nonsaturating write head 130. The write head 1130 records a gradient of magnetization in the tape of a direction opposite to the saturation recording applied by write head 120. Because of the foreign particle, the magnetic oxide adjacent the particle is pushed away from the nonsaturating write head and the gradient of magnetization in the tape opposite the defect is very markedly different from magnetization immediately before and behind the defect. This is shown in FIG. 8D, where the gradient recorded magnetic tape is passed over a read head 132. The defect again causes the magnetic tape to bulge or tent as it passes over the read head. However, if desired, an air bearing may be used at the read head 132 so that the tape does not make contact and does not tent or bulge. The important thing is the composite flux detected by the read head 132 at each position of the tape as it moves past the read head. In areas where there is no bump or foreign particle, the composite flux produced in the read head 132 is indicated by the arrows 134 and 136. As shown, these are small arrows directed to the right. However, in the vicinity of the defect or foreign particle, part of the magnetization directed to the right was eliminated because the defect prevented its being recorded by the write head 130. Accordingly, the composite flux picked up by the read head 130 is very strong to the left, as indicated by arrow 138. When the tape passes over the read head 132, there is a large change in flux as the composite flux 136 is followed by a composite flux 138, followed by composite flux 134. This very large change in flux from 136 to 138 to 134 produces a strong pulse in the windings of the read head 132. This is in decided contrast to no pulse produced by the prior DC tape testers, discussed with reference to FIG. 8B.

As previously pointed out, this hardware and testing technique permits the detection of very shallow or very small defects in magnetic tape down to and in the order of $10^{-5}$ inches in diameter or depth. This limitation is imposed by the present state of the magnetic recording art and is not a limitation on the principle of the invention. In other words, this testing technique can only detect errors down to $10^{-5}$ inches simple because (1) the best contact to date between tape and tape heads is in the order of $10^{-5}$ inches of separation, and (2) the frequency response of heads limited by their structure (specifically, the gap length) does not have a broad enough range to pick up enough energy when very small defects pass over the tape head. Therefore, in the future, if the state of the art develops tape heads of smaller gap length and improves tape contact, the inventive testing technique herein will also be able to detect defects smaller than $10^{-5}$ inches in diameter or depth.

While the invention has been particularly shown and described with reference to a preferred embodiment thereof, it will be understood by those skilled in the art that various changes in form and details may be made therein without departing from the spirit and scope of the invention. In particular, though the invention has been discussed in the environment of magnetic tape, it will be appreciated by one skilled in the art that it may be applied equally well to testing any moving magnetic storage medium, such as magnetic thin films, discs, and drums.

I claim:

1. Apparatus for detecting defects in a flexible magnetic storage medium comprising:
   means for recording in the medium a DC magnetic field whose strength varies as a function of depth into the medium whereby the magnetization of the medium normally varies as a gradient through the thickness of the medium, but where, if a defect in the medium is present, a portion of the magnetization gradient is lost;
   means for detecting magnetic flux differences between adjacent areas of the medium, the flux differences being due to differences in the magnetization gradient in adjacent areas of the medium.

2. The apparatus of claim 1 wherein said detecting means comprises:
   transducing means for generating an electric signal from magnetic flux differences between adjacent areas of the medium, said transducing means having a frequency response of predetermined slope;
   means for amplifying the electric signal generated by said transducing means, said amplifying means having a frequency response inverse to the frequency response of said transducing means so that the total frequency response of said transducing means and said amplifying means is flat.

3. Apparatus for detecting defects in flexible magnetic storage medium comprising the apparatus of claim 1 and, in addition:
   means for saturating the medium with a strong DC magnetic field before said recording means records a DC magnetic field in the medium, the direction of the magnetic field applied to the medium by said saturating means being opposite to the direction of the magnetic field applied to the medium by said recording means.

4. Apparatus for detecting defects in a flexible magnetic storage medium comprising the apparatus of claim 1 and, in addition:
   means for saturating the medium with a strong AC magnetic field before said recording means records a DC magnetic field in the medium.

5. In magnetic tape testing apparatus having a write head, a read head, and driving means to move the tape first past the write head and then the read head, apparatus for testing tape comprising:
   means for energizing the write head with a DC signal just strong enough for the write head to produce a magnetic field in the tape that varies as a function of depth into the tape whereby the magnetization of the tape normally varies as a gradient through the thickness of the tape, but where, if a defect is present, a portion of the magnetization gradient is lost;
   means for monitoring the read head for changes in magnetic flux in the read head caused by differences in the magnetization gradient in successive areas of the tape.

6. The apparatus of claim 5 wherein said monitoring means comprises:
   integrating means for integrating the signal from the read head, the integrating function being inverse to the differentiating function of the read head so that the output of said integrating means varies directly with flux in the read head.

7. Apparatus for testing tape comprising the apparatus of claim 5 and, in addition:
   erase means for DC erasing the tape before the tape passes under the write head, the magnetic field from said erase means being in the opposite direction to the magnetic field from the write head.

8. Apparatus for testing tape comprising the apparatus of claim 5 and, in addition:
   erase means for AC erasing the tape before the tape passes under the write head.

9. A method for testing a flexible magnetic storage medium for defects comprising the steps of:
   writing in the medium with a DC magnetic field whose strength varies as a function of depth into the medium;
   storing a gradient of magnetization in the medium according to the strength of the DC magnetic field, whereby the magnetization varies as a gradient through the thickness of the medium except where a defect in the medium permits only a portion of the gradient to be stored;
   reading changes in the magnetic field from one area to an adjacent area of the medium, said changes being due to defects which permitted only a portion of the magnetization gradient to be stored in the area of the defect.

10. The method of claim 9 wherein said reading step comprises the steps of:
    differentiating the magnetic field produced by the gradient of magnetization in each area of the medium so that changes in the gradient from area to adjacent area produce a signal;

integrating the signal so that the integrated signal varies directly with the magnetic field from the magnetization gradient in the medium.

11. A method of testing a flexible magnetic storage medium comprising the steps of claim 9 and, in addition:

saturating the medium with a DC field before writing on the medium so that before the writing the magnetization of the medium is opposite in direction to the field applied to the medium during the writing.

12. A method of testing a flexible magnetic storage medium comprising the steps of claim 9 and, in addition:

erasing the medium with an AC signal that saturates the medium before writing on the medium.

930-4008-00D
PO-1050
(5/69)

UNITED STATES PATENT OFFICE
CERTIFICATE OF CORRECTION

Patent No. 3,562,635          Dated February 9, 1971

Inventor(s) Gerald R. Parker

It is certified that error appears in the above-identified patent and that said Letters Patent are hereby corrected as shown below:

On the front page, data item [21], "768,902" should read --768,092--.

Signed and sealed this 25th day of May 1971.

(SEAL)
Attest:

EDWARD M. FLETCHER, JR.
Attesting Officer

WILLIAM E. SCHUYLER,
Commissioner of Pate